June 17, 1958   A. M. MOEN   2,839,083
VALVE HANDLE
Filed Nov. 8, 1954
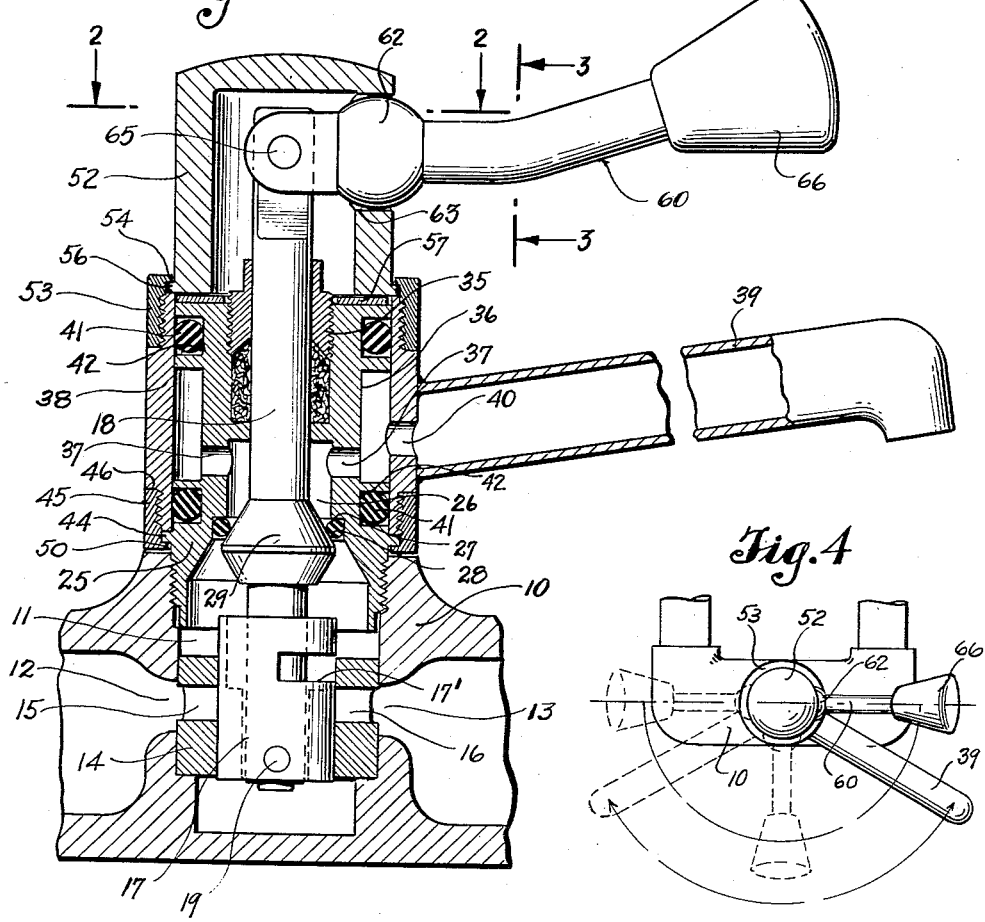
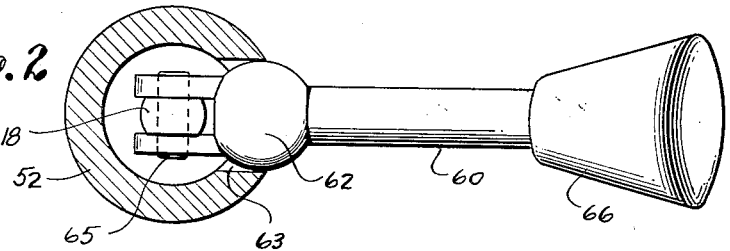
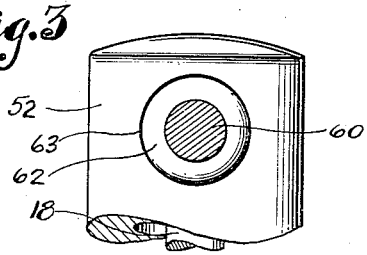
INVENTOR.
ALFRED M. MOEN
BY Cook & Robinson
ATTORNEYS

United States Patent Office 2,839,083
Patented June 17, 1958

2,839,083

VALVE HANDLE

Alfred M. Moen, Seattle, Wash.

Application November 8, 1954, Serial No. 467,328

1 Claim. (Cl. 137—636.2)

This invention relates to faucets and it has reference more particularly to a handle actuated mechanism whereby the control valve of a hot and cold water mixing faucet is manually adjusted to control the water mixture and volume or flow. While it is not desired to limit use of the present invention to any particular faucet, it is the intent that the present valve adjusting means be employed in faucets of the kind disclosed in my U. S. Patents No. 2,609,205 and No. 2,609,206, and also in connection with the valve mechanism of the faucet of my co-pending application filed under Serial No. 222,545 on April 24, 1951 now abandoned.

In faucets of the kind or character of that disclosed in the above mentioned U. S. patents and pending application, hot and cold water is adapted to be admitted into a valve housing in various proportionate amounts by the rotative adjustment of a valve, and the water mixture is adapted to be discharged, in varying amounts, by a longitudinal adjustment of the valve. Both the rotative and longitudinal adjustments of the valve are effected through the valve stem contained within the valve housing, and a handle that is connected with the stem and extends from the housing.

By reason of the use of the above mentioned parts, it has been required that the handle be supported by a fulcrum on which it can pivot for the longitudinal shifting of the valve, and that the fulcrum member be rotatable about the valve stem axis by means of or with the handle in its swinging adjustments from side to side as made to vary the mixture of hot and cold water. The construction and arrangement of parts, as heretofore used, has not been entirely satisfactory from the standpoint of economy of manufacture and assembly.

In view of the foregoing explanatory statement, it has been the primary object of this invention to provide a valve adjusting mechanism for faucets of the character mentioned, that is less expensive to manufacture and assemble with the faucet; that is entirely satisfactory in its use; that eliminates many previous problems and difficulties of assembling, and which presents a sturdy and attractive appearance.

Further objects and advantages of the invention reside in the details of construction and combination of parts and in their mode of operation, as will hereinafter be fully described.

In accomplishing these and other objects of the invention, I have provided the improved details of construction, the preferred forms of which are illustrated in the accompanying drawings, wherein:

Fig. 1 is a central, vertical section of a faucet having a valve adjusting handle merchandise embodied by the present invention.

Fig. 2 is a horizontal section, taken on the line 2—2 in Fig. 1.

Fig. 3 is a vertical section taken on line 3—3 in Fig. 1.

Fig. 4 is a top view of the faucet shown in reduced scale.

Referring more in detail to the drawings:

In the present illustrations, 10 designates a valve housing formed with a cylindrical chamber 11 into the opposite sides of which hot and cold water inlet passages, 12 and 13, open. Mounting in the chamber, in a tight pressed fit for its fixed securement, is a hardened cylindrical sleeve 14 which is formed with water passages 15 and 16 which register, respectively, with the passages 12 and 13. Each of these extends through an arc of 90°, and the passages are diametrically opposite each other.

Rotatably and reciprocally fitted in the cylindrical sleeve 14, is a cylindrical valve member 17, formed between its ends and at one side with an opening 17' extending circumferentially through an arc of 180°, which, by a longitudinal shifting of the member 17, can be moved into or from registration, to more or less extent with the passages 15 and 16 for volume control of inflowing water, and by rotative adjustment can be adjusted to receive water from either one of the inlets 15 or 16 or from both of them simultaneously in varying proportionate amounts.

The adjustment of the valve member 17 is effected through the mediacy of a valve stem 18 which has its lower end portion extended downwardly into the valve member 17 and operatively fixed thereto by a pin 19 that extends diametrically through their lower end portions. It is noted in Fig. 1 that there is clearance between the stem 18 and inner walls of the valve sleeve that provides for the upflow of water that enters the valve sleeve through the passage 17', into the upper end portion of the housing chamber 11.

The valve stem 18 is mounted for rotary and longitudinal shifting in a plug 25 that has an exteriorly threaded lower end portion threaded into the upper end of the housing chamber 11. The plug is formed with a bore 26 leading upwardly thereinto from its lower end which provides a water outflow passage. This passage has a downwardly facing annular shoulder 27 formed therein, against which an O-ring gasket 28 is seated. A conically tapered valve head 29 is fixed to or formed co-axially about the valve stem 18 to move upwardly against this O-ring to close the outflow passage 26 when the valve sleeve is lifted to a position at which the passages 15 and 16 are closed by that part of the valve sleeve which is below the level of the valve passage 17'.

The valve stem 18 extends upwardly in the plug 25 through a packing gland 35 in its upper portion. The stem is connected at its upper end to the control handle, as presently explained and described.

Intermediate its ends, the plug 25 is formed with an encircling channel 36 which communicates with the upper end of the plug outflow passage 26 through a plurality of radial ports 37. Surrounding and rotatable about the plug is a cylindrical sleeve 38, and extending from this is a water discharge spout 39. The spout communicates with the channel 36 through a hole 40 in the sleeve. The sleeve 38 is sealed against leakage adjacent its opposite ends by O-ring gaskets 41 that are seated in encircling channels 42—42 formed in the plug.

In order to hold the sleeve 38 properly in place on the plug, it is engaged at its lower end against an annular flange 44 formed on the plug, and a collar 45 is threaded onto the lower end of the sleeve 38 against a shoulder 46. This collar has an inturned flange 50 at its lower end that engages against the underside of the flange 44.

Fitted to the upper end of the sleeve 38 is a bonnet 52 of cylindrical form, open at its lower end to receive the upper end portion of the valve stem therein, and closed at its upper end. At its lower end, the bonnet rests upon the upper end of the sleeve 38 and washer 57 where it is held for rotation within a collar 53 that is threaded into the upper end of the sleeve. This collar has an inwardly directed annular flange 54 at its upper end, overlapping and holdingly engaged with an outwardly projecting annular shoulder 56 formed on the lower end of the bonnet.

This holding connection permits easy axial rotation of the bonnet relative to the sleeve without any undue looseness. A washer 57 is disposed between the adjacent ends of the plug and bonnet.

For the purpose of rotatably and reciprocally adjusting the valve 17, I provide the handle which is designated in its entirety by numeral 60. This is in the form of a lever arm that is equipped near its inner end with a ball shaped bearing portion 62 that is fitted for rotation and slight sliding movement in a hole 63 that is bored through a sidewall of the bonnet near its upper end. At its inner end the lever arm is bifurcated to receive a flattened upper end portion of the valve stem 18 between the spaced parts thereof, and for its pivotal connection with the stem by a pivot pin 65 passed through the parts as seen in Fig. 2. At its outer end, the handle is equipped with a knob 66, preferably of the shape illustrated in Fig. 2.

Assuming the various parts to be so constructed, and assembled as described, the opening, closing and adjusting of the faucet valve is accomplished as follows:

Assuming the valve to be in the closed position in which it is shown in Fig. 1, to open it, the outer end of the handle 60 is lifted. This causes the lever to pivot on ball 62 and to push the valve stem downwardly and shift the valve sleeve accordingly, thus moving the valve passage 17' into communication with the cold water inlet 16 to more or less extent, as determined by the extent to which the handle is lifted. If it is desired to draw only hot water, the handle is swung to an oppositely directed position to register the passage 17' with the inlet 15. If a mixture of hot and cold water is desired, the handle is swung to an intermediate position, and the proportionate amounts admitted will be varied with its change in position, as well understood in this art.

As the handle is swung from side to side to rotate the valve stem and valve, the bonnet is rotated therewith. As the handle is swung up or down, its ball bearing support 62 is permitted slight inward or outward movement in the wall opening 63 in which it is fitted.

Having thus described my invention, what I claim as new therein and desire to secure by Letters Patent is:

A mixing faucet comprising a valve housing, a valve chamber in said valve housing, a plurality of inlets extending through the housing into the valve chamber, an outlet at one end of the valve chamber, a valve means contained in the valve chamber, a stem connected to the valve means and extending therefrom through said outlet, said valve means being rotatably and reciprocally movable within the valve chamber to open and close said inlets to regulate mixture and volume, a cylindrical stem housing rotatably positioned on the valve housing and the free end of said stem extending thereinto, a round opening through the sidewall of the stem housing, a lever extended through said opening and pivotally connected at its inner end to the free end of the stem, a ball like portion on the lever intermediate its end adapted to engage the stem housing about the opening therein to provide a fulcrum whereby up and down movement at the outer end portion of the lever will effect longitudinal movement of the stem and valve means, said ball like portion and opening in the stem housing being of substantially the same diameter whereby a minimum of clearance is provided therebetween.

References Cited in the file of this patent

UNITED STATES PATENTS

| | | |
|---|---|---|
| 245,132 | Carr | Aug. 2, 1881 |
| 628,783 | Fisher | July 11, 1899 |
| 669,346 | Pickering | Mar. 5, 1901 |
| 819,566 | Luckett | May 1, 1906 |
| 1,517,956 | Compton | Dec. 2, 1924 |
| 2,267,976 | Hermann | Dec. 30, 1941 |
| 2,285,831 | Pennypacker | June 9, 1942 |
| 2,336,132 | Siegel | Dec. 7, 1943 |
| 2,632,622 | Carnahan | Mar. 24, 1953 |
| 2,671,469 | Carnahan | Mar. 9, 1954 |

FOREIGN PATENTS

| | | |
|---|---|---|
| 10,045 | Great Britain | of 1844 |